United States Patent
Hurlburt et al.

(12)
(10) Patent No.: US 6,224,846 B1
(45) Date of Patent: May 1, 2001

(54) METHOD FOR MAKING MODIFIED BOEHMITE ALUMINA

(75) Inventors: Paul K. Hurlburt, Leander; Daniel T. Plummer, Austin, both of TX (US)

(73) Assignee: Condea Vista Company, Houston, TX (US)

( * ) Notice: Subject to any disclaimer, the term of this patent is extended or adjusted under 35 U.S.C. 154(b) by 0 days.

(21) Appl. No.: 09/379,147

(22) Filed: Aug. 21, 1999

(51) Int. Cl.$^7$ .......................................................... C01F 7/02
(52) U.S. Cl. ............................ 423/625; 516/93; 516/100; 516/112
(58) Field of Search .................................. 423/625, 628; 252/363.5; 516/93, 100, 112

(56) References Cited

U.S. PATENT DOCUMENTS

| | | |
|---|---|---|
| 3,018,172 | 1/1962 | Tillman . |
| 3,867,296 | 2/1975 | Hunt . |
| 3,954,659 | * 5/1976 | O'Brien . |
| 4,076,638 | 2/1978 | Redmore et al. . |
| 4,123,231 | 10/1978 | Guthrie et al. . |
| 5,928,127 | * 7/1999 | Tanuma . |
| 5,955,185 | * 9/1999 | Yoshino et al. . |
| 6,017,968 | * 1/2000 | Beggs et al. . |

FOREIGN PATENT DOCUMENTS

| | | |
|---|---|---|
| 200149 | 5/1955 | (AU) . |
| 542803 | 1/1932 | (DE) . |
| 1168588 | 4/1964 | (DE) . |
| 4116522 | 11/1991 | (DE) . |
| 277048 | 9/1927 | (GB) . |
| 767958 | 2/1957 | (GB) . |
| 872149 | 7/1961 | (GB) . |
| 917947 | 2/1963 | (GB) . |
| 1007172 | 10/1965 | (GB) . |
| 60-123560 | 7/1985 | (JP) . |
| WO 95/12547 | 5/1995 | (WO) . |

OTHER PUBLICATIONS

R. Nass and H. Schmidt: "Formation and Properties of Chelated Aluminumalkoxides," in H. Hausner, G. Messing, et al. (eds), Ceramic Powder Processing. Deutsche Keramische Gesellschaft, Koln, pp. 69–76, admitted prior art.

* cited by examiner

Primary Examiner—Steven P. Griffin
Assistant Examiner—Christina Ildebrando
(74) Attorney, Agent, or Firm—Browning Bushman

(57) ABSTRACT

A process for making a modified boehmite alumina comprising reacting at elevated temperatures a boehmite alumina with a compound having the formula:

$$X(SO_3M)_n$$

wherein X is an organic moiety, M in a monovalent cation, and n is an integer reflecting the number of $SO_3M$ groups bonded to said organic moiety to produce a reaction mixture containing modified boehmite alumina and recovering solid, modified boehmite alumina from the reaction mixture.

8 Claims, No Drawings

METHOD FOR MAKING MODIFIED BOEHMITE ALUMINA

BACKGROUND OF THE INVENTION

1. Field of the Invention

The present invention relates to boehmite aluminas, more particularly to modified boehmite aluminas that are dispersible in polar organic and/or aqueous media.

2. Description of the Prior Art

Thickened or viscous compositions containing aqueous solutions and/or polar organic liquids have utility in a wide variety of applications. For example, such thickened compositions can be used as coating removers to remove paint, varnish, and similar coatings from surfaces; graffiti removers; deicers for use on aircraft; etc. Typically, the thickened organic-liquid-containing compositions necessarily contain, in addition to water, the desired water miscible (soluble) organic liquid and a thickening additive that imparts the desired rheological properties to the composition. One thickener that has been widely used for water/polar organic solvents is boehmite alumina. Depending on how it is treated, boehmite alumina is dispersible in water and aqueous solutions containing polar, miscible organic liquids. However, boehmite alumina is generally not dispersible in anhydrous mixtures or solutions of polar organic liquids.

There are instances when it would be desirable to prepare a thickened or viscous polar organic liquid that did not contain water. For example, in the deicing of aircraft, the glycols that are used drain to sumps from which the spent glycol can be recovered and reclaimed so as to be reusable. Obviously, the presence of large amounts of water in the glycols increases the costs of reclaiming the glycol. Additionally, there are instances in which the presence of water may lessen the effectiveness of the polar organic liquid, e.g., in certain cleaning applications. Clearly, it would be desirable to have a boehmite alumina that is dispersible not only in water, but also in polar organic liquids essentially free of water.

SUMMARY OF THE INVENTION

It is therefor an object of the present invention to provide a method for modifying a boehmite alumina.

Another object of the present invention is to provide a method for modifying a boehmite alumina to render it dispersible in aqueous solutions, as well as anhydrous, polar organic liquids.

Still a further object of the present invention is to provide a thickened liquid-containing composition wherein the liquid can comprise an aqueous solution or a polar organic liquid.

Still a further object of the present invention is to provide a solid, modified boehmite alumina that can be used in a variety of applications, including thickening aqueous solutions and anhydrous, polar organic liquids.

The above and other objects of the present invention will become apparent from the description given herein and the appended claims.

According to one aspect of the present invention, there is provided a process for making a modified boehmite alumina wherein an aqueous slurry of a boehmite alumina is reacted at a temperature of from 90 to 300° C. with a compound having the formula:

$$X(SO_3M)n$$

wherein X is an organic moiety, M is a monovalent cation, and n is an integer reflecting the number of —$SO_3M$ groups bonded to the organic moiety. The reaction mixture that results contains a boehmite alumina that has been modified, a solid, modified boehmite alumina is thus recovered from the reaction mixture.

In a further aspect of the present invention, there is provided a solid, modified boehmite alumina produced according to the process described above.

In yet another embodiment of the present invention, there is provided a thickened composition comprising a carrier that is liquid at ambient temperature and from about 2 to about 30% by weight of the modified boehmite alumina produced by the process described above.

DESCRIPTION OF THE PREFERRED EMBODIMENTS

According to the process of the present invention, an aqueous slurry or other aqueous dispersion or mixture of a boehmite alumina is reacted at an elevated temperature with a sulfonic acid compound having the formula:

$$X(SO_3M)_n$$

wherein X is an organic moiety, M is a monovalent cation, and n is an integer reflecting the number of —$SO_3M$ groups bonded to the organic moiety. Generally, the reaction is carried out at a temperature of from 90 to 300° C., more preferably from 150 to 250° C. Reaction pressures can vary from atmospheric to super-atmospheric while reaction times can range from as short as 0.1 hour to 30 hours or longer. It will be appreciated that the greatest variable with respect to reaction times is the type of sulfonic acid compound used to modify the boehmite alumina.

The reaction between the boehmite alumina and the sulfonic acid modifier produces a reaction mixture containing modified boehmite alumina, which, depending on the nature of the sulfonic acid compound used, can be in the form of a sol—i.e., basically a colloidal suspension—or in a two-phase mixture wherein the modified alumina is not dispersed in the reaction mixture. In any event, the modified alumina is recovered from the reaction mixture in solid form, the nature of which will vary depending upon the form of the modified alumina in the reaction mixture. For example, in the case where the reaction mixture is a sol, the solid, modified boehmite alumina can be recovered by spray drying or some similar technique that readily produces a powder. Alternatively, if the modified boehmite alumina is not dispersed, e.g., is settled out, the solid modified boehmite alumina can be recovered by decantation, filtering, etc., and the recovered solid dried in cake form, which, if desired or necessary, can be ground to a powder of the desired particle size. In drying the modified boehmite alumina, excessively high temperatures should be avoided, and generally the solid, modified alumina can be dried at a temperature of from about 50° C. to about 250° C., depending upon the sulfonic acid modifier originally used.

To use the modified boehmite alumina in forming thickened compositions, it is generally necessary that the modified boehmite alumina be in powder form and, to this end, grinding can be employed if necessary such that the alumina particles have a particle size generally ranging from about 0.5 μ to about 100 μ. In certain cases, such as, for example, in spray drying, grinding may not be necessary as the particles of the spray-dried material are generally of the appropriate size to form the thickened compositions.

The amount of sulfonic acid modifier employed in the process of the present invention will vary widely, depending upon the nature of the sulfonic acid modifier. Generally speaking, in reacting the boehmite alumina with the sulfonic acid modifier, the mole ratio of alumina calculated as $Al_2O_3$ to the mole ratio of sulfonic acid calculated as $—SO_3H$ will be from about 100:1 to about 1:2. It will be recognized that virtually any modification of the boehmite alumina with the sulfonic acid modifier will increase the polar organic liquid dispersibility of the resulting modified alumina. However, as a practical matter, to achieve ready dispersibility in polar organic liquids or aqueous liquids, the above mole ratios are preferred.

The type of sulfonic acid modifier employed in the process of the present invention can vary widely. Non-limiting examples of suitable sulfonic acid modifiers include alkyl sulfonic acids having the formula:

wherein R is an alkyl group having from 1 to 16 carbon atoms; aryl sulfonic acids having the formula:

wherein Ar is an aryl group wherein the aryl group can be a phenyl group, a benzyl group, a tolyl group, a naphthyl group, or any other molecule containing an aromatic nucleus, including condensed six carbon rings such as phenanthrene, anthracene, etc.; metallo-organic compounds with sulfonic acid functionalities; polymers such as sulfonated styrenebutadiene copolymers, sulfonated fluorocarbons, etc.; sulfonated chiral species; and virtually any other sulfonated organic species that can be used to modify the boehmite alumina. Particularly preferred when making a dispersible modified alumina are sulfonic acid modifiers such as alkyl sulfonic acids, including methane sulfonic acid, ethane sulfonic acid, and other alkyl or aliphatic sulfonic acids and aryl sulfonic acids such as p-toluenesulfonic acid, phenol red. It will be appreciated that the alkyl sulfonic and the aryl sulfonic acids include substituted alkyl and aryl sulfonic acids such as, for example, trifluoromethane sulfonic acid, phenol red, sulfonated xylenes, and other, more complex molecules, that contain sulfonic acid functionality but that are free of substituents or groups that would deleteriously affect the modification of the boehmite alumina to a modified boehmite alumina. As noted above, M is a monovalent cation, preferably hydrogen. However, M can also be sodium, potassium, lithium, etc, provided that such ions are not present in amounts that cause gelling.

As can be seen from the above with respect to the type of sulfonic acid modifiers that can be employed, the value of n and, more specifically, the sulfonic acid content of the sulfonic acid modifier can vary widely. For example, in the case of an alkyl sulfonic acid, such as methane sulfonic acid, the sulfonic acid content of the molecule on a weight basis is quite high. On the other hand, in the case of a sulfonated polymer, such as a sulfonated styrene butadiene polymer, the weight content of the sulfonic acid in the polymer might be relatively small, depending on the degree of sulfonation. Indeed, it is this wide disparity in the amount of the sulfonic acid present in the sulfonic acid modifier that allows for tailoring of the boehmite alumina to achieve a modified boehmite alumina with desired properties. In general, the sulfonic acid modifier can contain from as little as 5% by weight sulfonic acid to as much as 85% by weight sulfonic acid, calculated as $—SO_3H$.

It will be apparent from the wide variety of sulfonic acid modifiers that can be employed in the process of the present invention that numerous, useful compositions can be achieved. For example, using sulfonated metallo-organic compounds, one can achieve alumina catalysts having magnetic properties while using sulfonated polymers such as sulfonated styrene-butadiene polymers, and one can produce catalytic entities formed by the alumina or by the polymer. In the case of sulfonated chiral moieties, the resulting modified boehmite alumina can be used for enantiomeric separations, as well as chiral catalysis.

Thus, the modified boehmite alumina produced by the process of the present invention can not only be used as a thixotrope in aqueous and/or polar organic media but can also be used as substrates, membranes, catalysts, and many other uses wherein the modified boehmite alumina, in and of itself, or in conjunction with its associated sulfonic acid modifier can function in a variety of environments.

To more fully illustrate the present invention, the following non-limiting examples are presented. While in the following examples, the modified boehmite alumina is used as a thixotrope for aqueous and/or polar organic liquids, as set forth above, it will be appreciated that the modified boehmite aluminas made by the process of the present invention have many other uses.

EXAMPLE 1

An alumina slurry containing 31.5 g of CATAPAL® A, a boehmite alumina marketed by CONDEA Vista Company, was reacted with 2.09 g of p-toluenesulfonic acid for 2 hours at 350° F. The resulting reaction mixture was an alumina sol that was spray-dried to produce a powder. The modified boehmite alumina powder was dispersible in absolute methanol to a transparent sol with an average, dispersed particle size of 47 nm. It was also found that the modified boehmite alumina powder could be dispersed in ethylene glycol or water. It was further found that the dispersion of the modified boehmite alumina in methanol was stable against gellation at a concentration of 20% by weight alumina but that gellation occurred within two days if the content of the modified boehmite alumina was raised to 25% by weight. The methanol sol was found to be miscible with other organic liquids such as tetrahydrofuran and acetonitrile.

EXAMPLE 2

One hundred (100) g of CATAPAL alumina powder was reacted with 100 g of p-toluenesulfonic acid in 500 ml of water for 24 hours under reflux conditions. The resulting reaction mixture was a two-phase mixture of an aqueous solution and modified boehmite alumina that had settled— i.e., there was no dispersion. The liquid portion was decanted and the white solid dried at 60° C. for 24 hours. The resulting modified boehmite alumina powder dispersed in absolute methanol to a transparent sol but was found not to be dispersible in water and not wetted by water. It was further found that methanol sol was stable against gellation at 20% by weight alumina and that this sol could be mixed with other solar organic liquids, such as tetrahydrofuran, toluene, and acetonitrile.

EXAMPLE 3

Three (3) g of the alumina powder produced per Example 2 was mixed with 1 g of methanol and 6 g of tetrahydrofuran to produce a transparent sol that could be coated on a glass microscope to create a transparent and durable coating that dried without cracks.

EXAMPLE 4

An alumina slurry containing 31.5 g of CATAPAL A boehmite alumina was reacted with 1.06 g of methane-sulfonic acid for 2 hours at 350° F. The resulting alumina sol was dried. The dried modified boehmite alumina powder was easily dispersible in absolute methanol to a transparent sol. It was also found that the dried modified boehmite alumina powder could also be redispersed in water. The methanol sol was found to be stable against gellation at up to 20% by weight alumina.

EXAMPLE 5

An alumina slurry of 31.5 g of CATAPAL A boehmite alumina was reacted with 1.65 g of trifluoromethanesulfonic acid for 2 hours at 350° F. The resulting alumina sol was dried to produce a modified boehmite alumina powder that easily dispersed in absolute methanol to form a transparent sol. It was also found that the modified boehmite alumina powder could be redispersed in water. The methanol sol was stable against gellation at 20% alumina by weight.

EXAMPLE 6

An alumina slurry of 100 g of CATAPAL A boehmite alumina was reacted with 1.2 g of phenol red at 350° F. for 2 hours. The resulting sol was dried to a red powder that could be redispersed in water.

Three hundred (300) g of CATAPAL® A alumina slurry was mixed with 1.38 g of butane sulfonic acid. This mixture was aged in a stainless steel autoclave vessel for 18 hours at 300° F. The resulting product was a colloidal alumina dispersion of pH 3.5–4.0 that gelled upon addition of sodium chloride. Drying the product at 60° C. followed by grinding produced a white powder that dispersed easily in absolute methanol. The methanol dispersed sample was dried and analyzed for surface area, pore volume, and average pore radius in the boehmite form with the following results:

Surface area: 147 m²/g
Pore Volume: 0.33 mL/g
Pore Radius: 42Å

EXAMPLE 7

An alumina slurry containing 10 g of CATAPAL® A boehmite alumina was mixed with 0.6 g $CF_3SO_3H$ at ambient temperature, then spray-dried at 200° C. to produce a powder that disperses easily in absolute methanol to 20% by weight solids without gellation.

EXAMPLE 8

An alumina slurry containing 10 g of DISPAL® 11N7-80 water-dispersible boehmite alumina was mixed with 0.1 g $CF_3SO_3H$ at ambient temperature, then spray-dried at 200° C. to produce a powder that disperses easily in absolute methanol to 20% by weight solids.

The above examples clearly demonstrate that by the process of the present invention, boehmite alumina can be tailored, depending upon the sulfonic acid modifier employed, to be dispersible in water and/or polar organic liquids or dispersible in organic liquids only. In particular, the process of the present invention provides a method to produce a boehmite alumina that is dispersible in anhydrous polar organic liquids. Accordingly, one can prepare water-free thickened polar organic liquids that, because no water is present, can be used in applications where water would prove to be deleterious.

It was also found that the thickened compositions of the present invention, for the most part, were shear-thinnable, which enhances the applicability of such compositions.

Polar organic liquids that can be thickened with the modified boehmite aluminas of the present invention include alcohols, glycols, tetrahydrofuran, toluene, acetonitrile, etc. Non-limiting examples of alcohols and glycols include methanol, ethanol, ethylene glycol, diethylene glycol, etc. In general, monohydric alcohols containing from 1 to 4 carbon atoms and polyols containing from 1 to 6 carbon atoms can be thickened with the modified boehmite alumina of the present invention. Indeed, it will be apparent that numerous polar organic liquids can be thickened with the boehmite alumina of the present invention. The polar organic liquids or aqueous solutions forming the modified alumina dispersions can be referred to as carrier liquids and are normally liquid at ambient temperature.

In general, when forming a dispersion/sol of the modified alumina in a carrier liquid, the modified alumina will be present in an amount of from 2 to 30% by weight, depending on the nature of the carrier liquid. For example, when an alcohol such as methanol is used as the carrier, the amount of modified alumina present can generally not exceed 20% by weight. However, in other polar organic liquids, mixtures of polar organic liquids, and water or water alone, higher loadings of the modified aluminas can be tolerated to form an ungelled, thickened composition.

The foregoing description and examples illustrate selected embodiments of the present invention. In light thereof, variations and modifications will be suggested to one skilled in the art, all of which are in the spirit and purview of this invention.

What is claimed is:

1. A process for making a dispersible alumina comprising: reacting an aqueous slurry or aqueous dispersion or aqueous mixture of a boehmite alumina at a temperature of from 150 to 300° C. with a compound having the formula:

$$X(SO_3M)_n$$

wherein X is an organic moiety, M is a monovalent cation, and n is an integer reflecting the number of —$SO_3M$ groups bonded to said organic moiety, to produce a reaction mixture containing modified boehmite alumina; and recovering from said reaction mixture a solid, modified boehmite alumina that can be dispersed in water and polar organic liquids.

2. The process of claim 1 wherein said reaction mixture comprises a sol and said solid, modified boehmite alumina is recovered by drying said sol.

3. The process of claim 2 wherein said solid, modified boehmite alumina is obtained by spray-drying said sol.

4. The process of claim 1 wherein said modified boehmite alumina in said reaction mixture comprises a colloidal dispersion and further including the step of adding a gelling agent to said reaction mixture prior to recovery of said solid, modified boehmite alumina.

5. The process of claim 4 including grinding said solid, modified boehmite alumina to produce a powder.

6. The process of claim 1 wherein the mole ratio of boehmite alumina calculated as $Al_2O_3$ to sulfonic acid groups calculated as —$SO_3$ is from 100:1 to 1:2.

7. The process of claim 1 wherein said compound comprises an alkyl sulfonic acid having the formula $RSO_3M$ wherein R is an alkyl group having from 1 to 16 carbon atoms.

8. The process of claim 1 wherein said compound comprises an aryl sulfonic acid having the formula $ArSO_3M$ wherein Ar is an aryl group.

* * * * *